Sept. 28, 1971 W. O. MUELLER 3,608,247
GRINDING JIG
Filed May 15, 1969 2 Sheets-Sheet 1

INVENTOR.
William O. Mueller
BY
Harness, Dickey & Pierce
ATTORNEYS.

Sept. 28, 1971 W. O. MUELLER 3,608,247
GRINDING JIG
Filed May 15, 1969 2 Sheets-Sheet 2
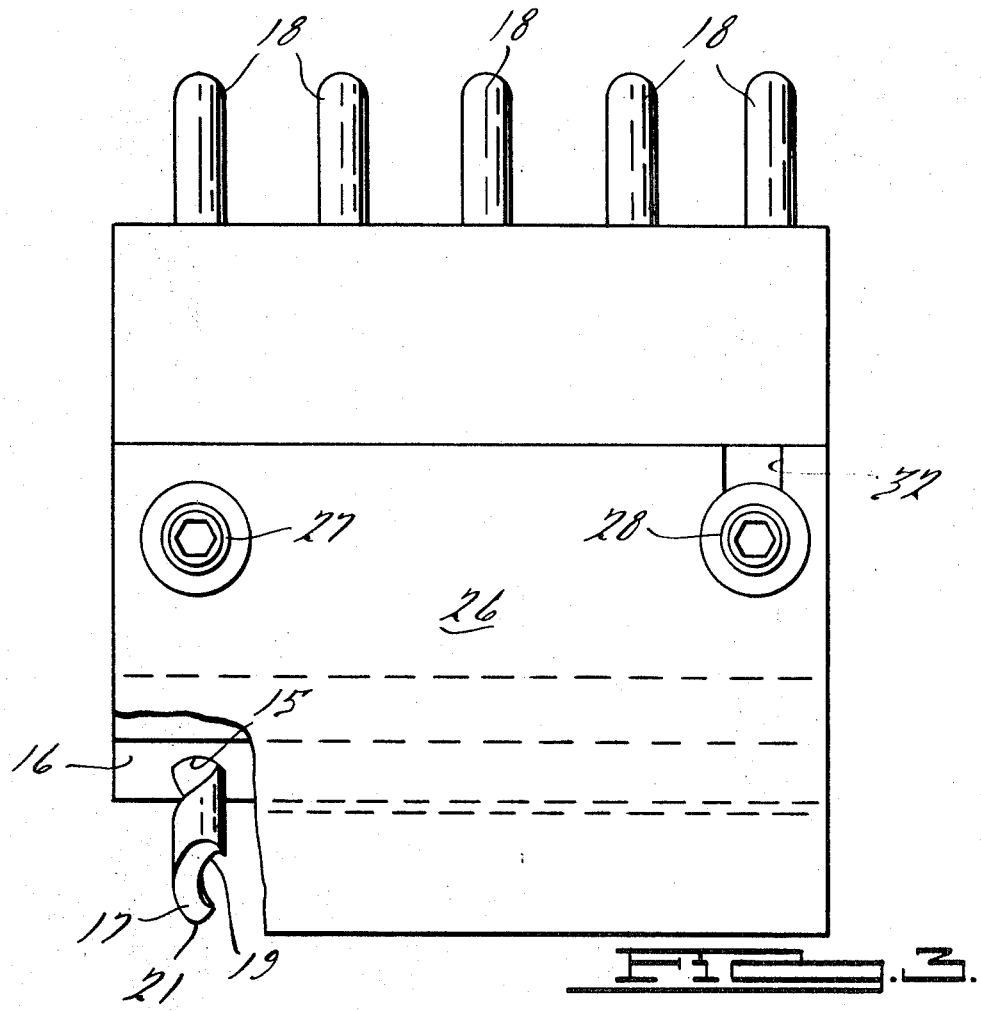
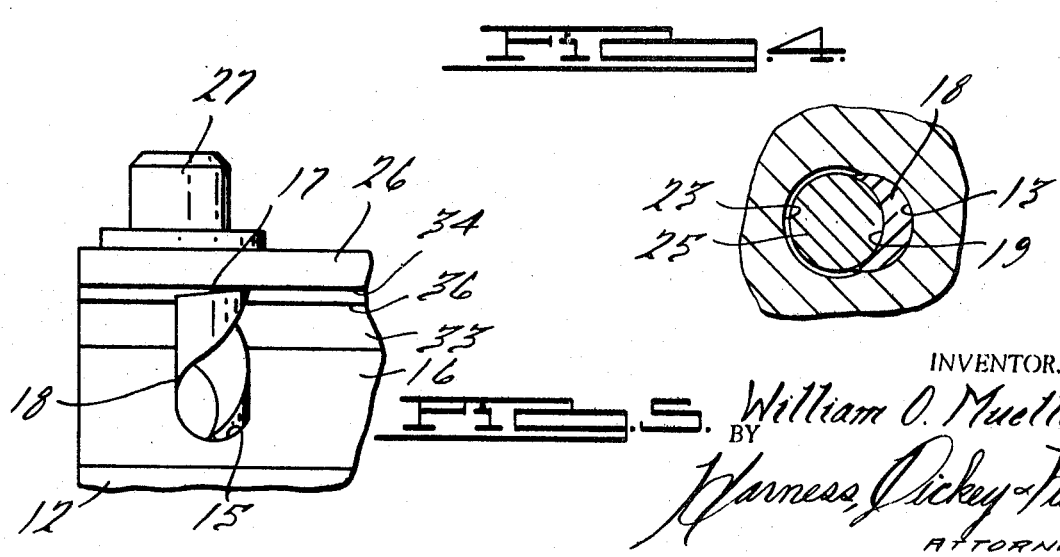
INVENTOR.
William O. Mueller
BY Harness, Dickey & Pierce
ATTORNEYS 3,608,247
GRINDING JIG
William O. Mueller, Detroit, Mich., assignor to Hans Sickinger Co., Pontiac, Mich.
Filed May 15, 1969, Ser. No. 824,939
Int. Cl. B24b 3/24
U.S. Cl. 51—219                                     9 Claims

ABSTRACT OF THE DISCLOSURE

A method and means for regrinding single fluted drills, used to drill holes in stacks of loose leaf filler paper, in a manner which will maintain the proper cutting edge on the drill. The method includes feeding the drill along an inclined helical path a predetermined distance past a point at which the leading face is parallel to the plane of action of a grinder, locking the drill in place, and grinding the drill face down said predetermined distance. The means for carrying out the method comprises a jig having a plurality of inclined drill supporting holes, a combined guiding and locking screw for each drill, and a locating plate pivotally mounted on the jig.

BACKGROUND OF THE INVENTION

(1) Field of the invention

The invention relates to means for regrinding single fluted drills of the type shown in Pat. No. 3,051,205 issued Aug. 28, 1962. Such drills have inclined faces which intersect the cylindrical drill surface in such a manner that the furthermost drill edge will be on the outer drill surface, the drill performing a scribing action on the paper. In regrinding such drills it is necessary that the proper cutting edge be maintained so that this scribing action will take place. If the reground surface is made parallel to the old surface, this will shift the position of the grinding edge because of the helical flute, eventually resulting in an improper construction.

(2) Description of the prior art

In the past regrinding of such drills has been done by placing the drill in a vise and using an indicator to properly locate the drill as well as to determine whether a proper cut has been made.

BRIEF SUMMARY OF THE INVENTION

According to the invention, the drill is fed along the helical path of its flute on an axis which is inclined with respect to the plane of action of a grinder. The angle of inclination is that which the drill face has with respect to the drill axis. A locating stop is so positioned that the drill will be fed a short predetermined distance past a position in which the face is parallel to said grinding plane. The drill is then locked in position and the grinder fed said predetermined distance to regrind the face.

The illustrated means for carrying out this method comprises a jig in the form of a block having a plurality of drill supporting holes, and a tapered guiding and locking screw for each hole. A locating plate is pivotally mounted on the block and has a surface against which the drills abut before they are locked. The plate is then retracted and the drill face is ground said predetermined distance.

In the illustrated embodiment of the invention, the locating plate is provided with a recessed portion against which the drill faces abut. The main surface of the plate is in the plane of the newly reground faces so that the plate may be used to check the depth of regrinding.

BRIEF DESCRIPTION OF THE DRAWINGS

FIG. 3 is a top plan view of the jig, parts being broken away;

FIG. 4 is a fragmentary cross-sectional view taken along the line 4—4 of FIG. 1 and showing the manner in which the guiding and locking screw interfits with the drill, and FIG. 5 is a fragmentary elevational view showing the manner in which a drill face to be reground engages the locating surface, this view being taken in the area marked 5 of FIG. 2.

DESCRIPTION OF THE PREFERRED EMBODIMENT

Figure 1:
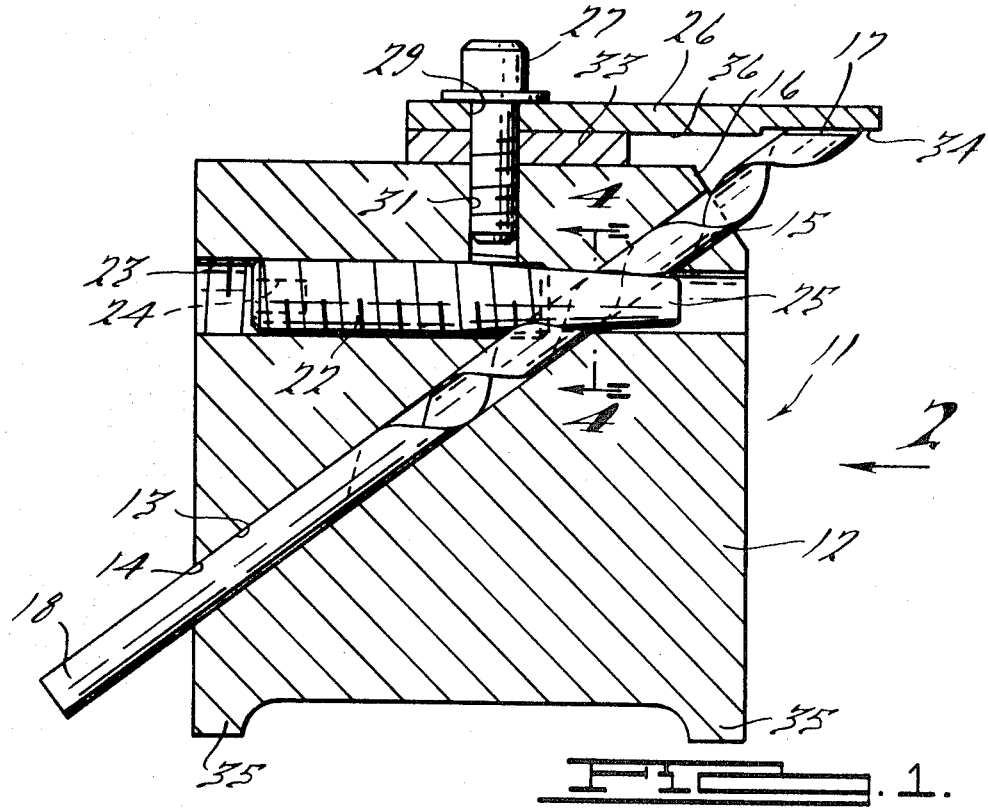
FIG. 1 is a cross-sectional view in elevation of the jig used to carry out the method of this invention, taken along the line 1—1 of FIG. 2.
Figure 2:
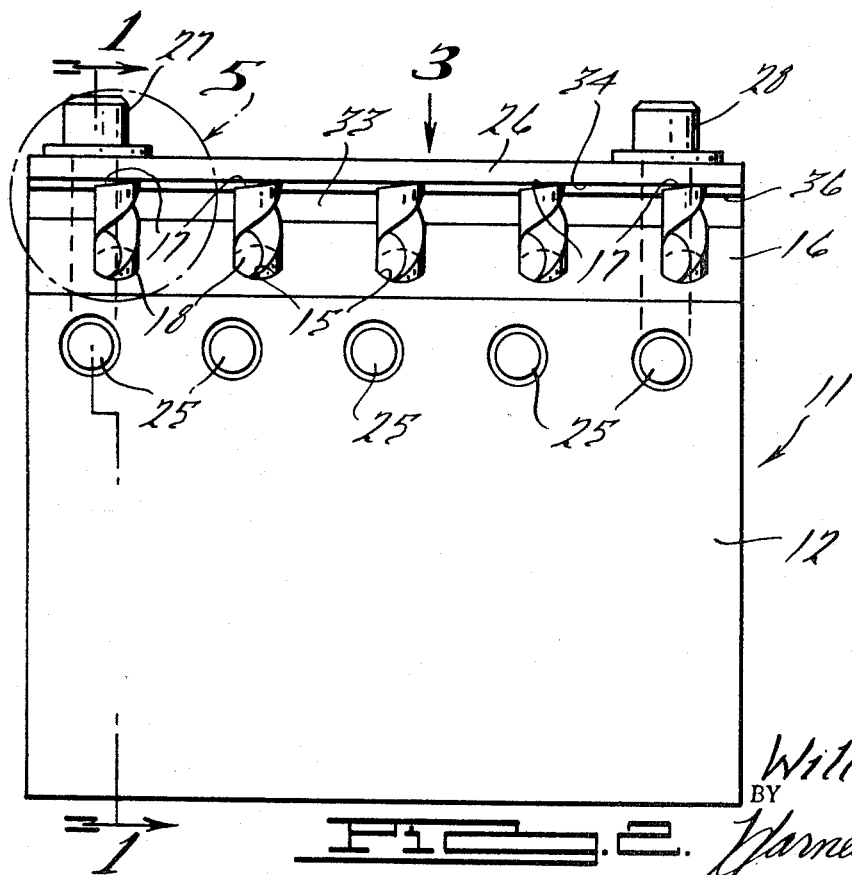
FIG. 2 is a front elevational view in the direction of the arrow 2 of FIG. 1.

The grinding jig is generally indicated at 11 and comprises a block 12 having five drill supporting holes 13. These holes are inclined upwardly from their entrance 14 to their exit 15 which opens onto an inclined face 16 of the block. The angle of holes 13 with respect to the horizontal is the same as the angle which the face 17 of a drill 18 has with respect to the drill axis. Drill 18 is of the single fluted type as described in the above mentioned patent. Face 17 must have the proper orientation with respect to the flute 19 of drill 18 so that the leading edge 21 of face 17 (FIG. 3) will be on surface 18, thereby causing a circle of the proper diameter to be scribed on a paper when the drill rotates.

Five guiding and locking screws 22 are provided in block 12, these screws being threaded into horizontal holes 23 and having recesses 24 for rotation by a tool (not shown). The inner ends of these screws are tapered as indicated at 25, and holes 23 intersect holes 13 so that the tapered portions of the screws 22 will pass through one side of each hole 13. The relationship of the parts is such that when feeding each drill 18 upwardly through its hole 13, it can only pass screw portion 25 if flute 19 of the drill faces screw portion 25, as seen in FIG. 4. Thus, the drill will be fed along the helical path of its flute as its face passes outwardly through exit 15 of hole 13.

A locating plate 26 is mounted on block 12 by means of a pair of bolts 27 and 28. Bolt 27 passes through an aperture 29 in plate 26 and is threaded into an aperture 31 of the block. Bolt 28 passes through an open-ended slot 32 in plate 26 and is also threaded into the block. A spacer 33 is disposed between plate 26 and block 12, bolts 27 and 28 passing through this spacer.

A recess 34 is formed in the outer edge of plate 26, the depth of this recess being equal to the amount of grinding normally necessary to regrind the faces of drills 18. A typical depth of recess 34 could be 0.010″. Recess 34 is so positioned that as drills 18 are fed through holes 13, with plate 26 in the position of the figures, face 17 will come up against the surface of recess 34 in the manner shown in FIG. 5.

In operation, after drills 18 have been fed through the holes 13 as aforesaid, screws 22 will be rotated until tapered portions 25 lock the drills in position. Jig 11 will then be placed on the table of a horizontal surface grinder, feet 35 being provided for this purpose, and plate 26 swung out of position, pivoting around bolt 27 to expose the drill faces. It will be noted that when in their locked positions, faces 17 of drills 18 will not be horizontal but will be slightly tilted, as shown in FIG. 5.

The grinding wheel will then be fed until it barely touches faces 17; this can be noted by the appearance of a few sparks. A reading will then be taken on the grinding wheel feed indicator and the grinding wheel fed downwardly a distance equal to the depth of recess 34, as all five drills are ground.

This will bring the planes of faces 17 down until they are parallel to the plane of action of the grinding wheel, that is, horizontal. A visual inspection then can be made to see if all the nicks and irregularities have been removed from the drill faces. For those drills which need further regrinding, the process may be repeated. That is, screw 22 for that drill will be rotated until the drill is unlocked. Plate 26 will be swung back into its locating position, secured by bolts 27 and 28 and the drill fed helically until its face 17 again contacts the surface of recess 34. The drill will then be locked again, plate 26 retracted and the face of the drill reground in the same manner as previously.

The undersurface 36 of plate 26 may be used as a gauge to see whether the drills have been properly ground. By swinging surface 36 over the faces of the drills after they have been reground, interference between surface 36 and the drill faces will indicate that not enough has been ground whereas if the drill ends are not flush with surface 36, this will indicate that too much material has been ground.

The novel method and means of this invention therefore provides a simple way to regrind single fluted drills with reduced setup time, and assures uniformity and accuracy of the reground faces.

What is claimed is:

1. In a method for regrinding the inclined face of a single fluted drill which intersects the cylindrical drill surface in such a manner that the furthermost drill surface will be on the outer drill surface, the steps of guiding said drill by engagement with its flute to prevent pure rotational or pure longitudinal movement thereof but to allow only helical movement, moving said drill helically along the path of its flute while so guided on an axis inclined from the plane of action of a grinder by an angle equal to that which the drill face makes with the drill axis, continuing said helical drill movement a predetermined distance past a point where the drill face is parallel to said plane of grinder action, locking the drill in position so that the drill face forms an angle with the plane of grinder action, and grinding the drill face down said predetermined distance, said grinding being in a plane angular to the drill face being ground.

2. In a jig for regrinding the faces of single fluted drills, a block mountable on a grinding table which is parallel to the plane of grinder action, a drill supporting hole passing through said block at an angle with respect to the table equal to the angle which the drill face makes with the drill axis, means carried by said block and guiding said drill as it passes upwardly through said hole for helical movement along the path of its flute, locating means mounted on said block and engageable by the drill face after it has exited from said hole, said locating means being such that the drill will stop a predetermined distance past a point at which the drill face is parallel to the grinding table, means in said block for locking the drill in position as so located, and means for retracting the locating means to expose the drill face, whereby the drill face may be ground down said predetermined distance, thereby creating a reground face parallel to the plane of action of the grinder.

3. The combination according to claim 2, said means for guiding and locking the drill comprising a screw threaded into said block in a hole which partially intersects the drill supporting hole, said screw having a tapered portion interfitting with the flute.

4. The combination according to claim 2, said locating means comprising a plate pivotally mounted on said block.

5. The combination according to claim 4, said plate having a recess engageable by the drill face, said recess having a depth equal to said predetermined distance.

6. The combination according to claim 5, said plate being swingable so that its main surface may pass over said drill whereby said main surface may act as a checking surface after the grinding.

7. The combination according to claim 3, said locating means comprising a plate pivotally mounted on said block.

8. The combination according to claim 2, said block being provided with a plurality of drill guiding holes, and corresponding guiding and locking means for the drills.

9. The combination according to claim 8, said locating means comprising a plate pivotally mounted on said block.

References Cited
UNITED STATES PATENTS

| | | | |
|---|---|---|---|
| 2,408,544 | 10/1946 | Banner | 51—221X |
| 2,740,240 | 4/1956 | Rugels | 51—221 |
| 3,197,924 | 8/1965 | Mitchell | 51—219 |
| 3,374,587 | 3/1968 | Simpkins et al. | 51—219 |

GRANVILLE Y. CUSTER, Jr., Primary Examiner